UNITED STATES PATENT OFFICE.

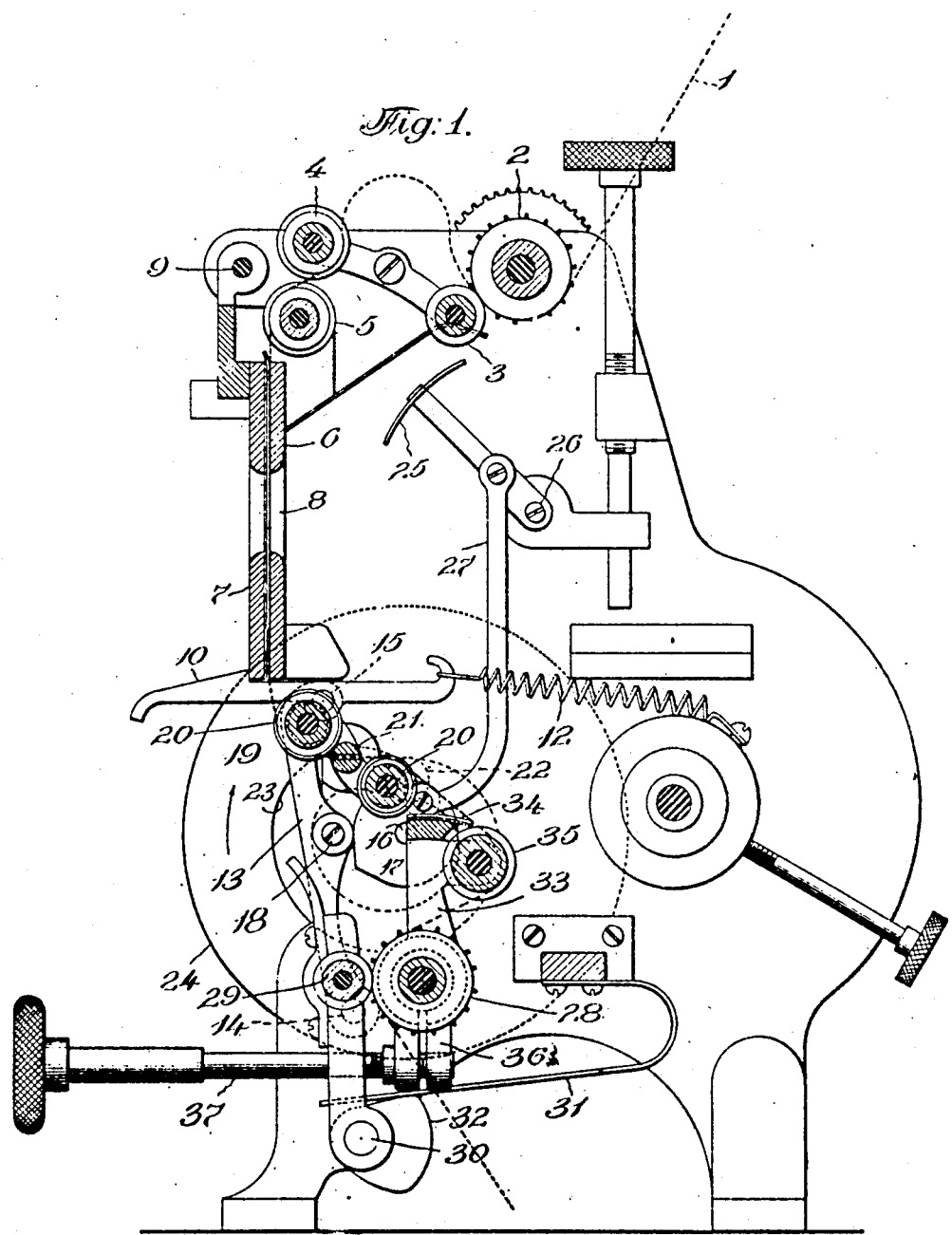

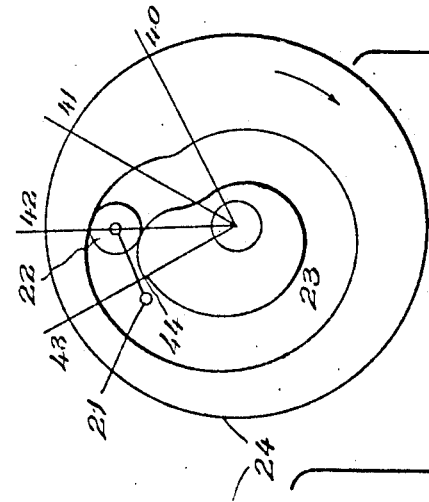
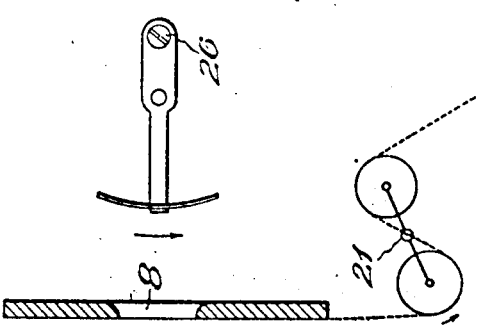
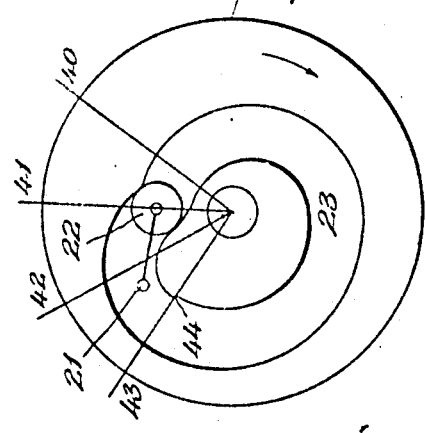
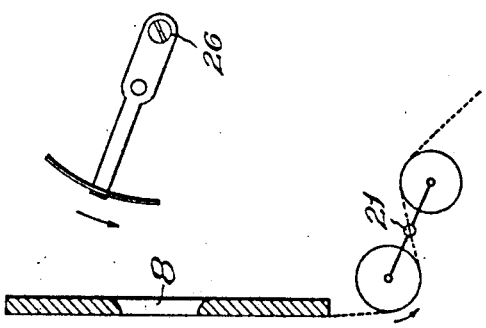
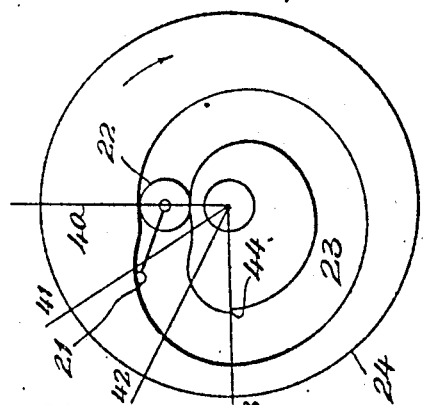
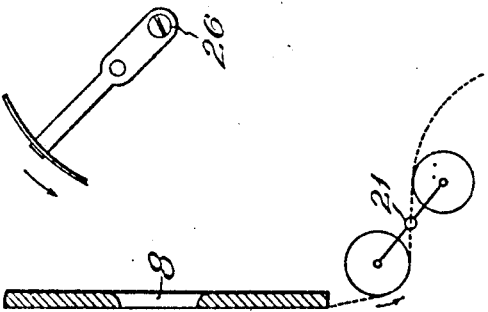

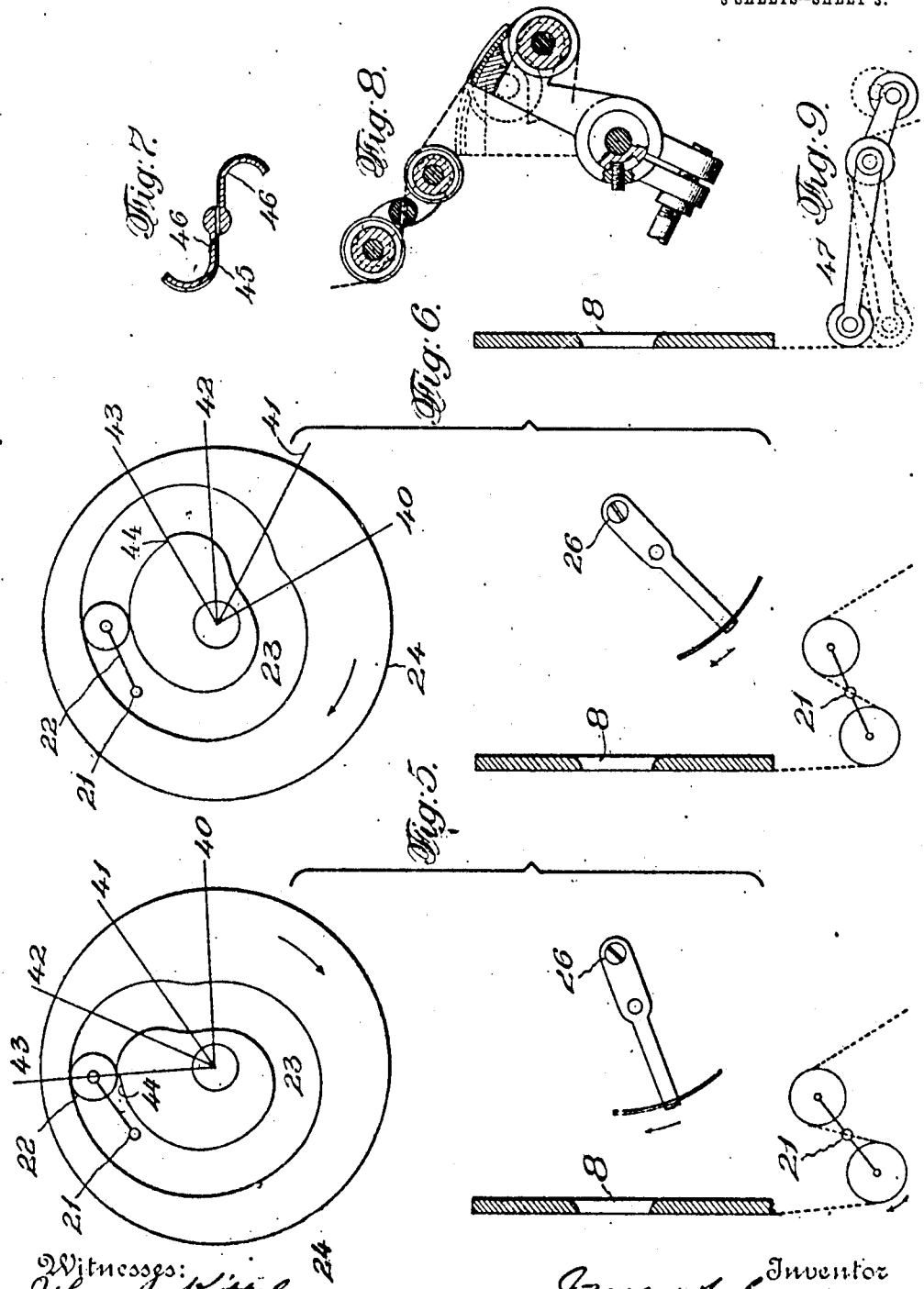

JAMES A. CAMERON, OF NEW YORK, N. Y., ASSIGNOR TO CAMERON PICTURE MACHINE COMPANY, A CORPORATION OF NEW YORK.

MOVING-PICTURE MACHINE.

1,020,383.  Specification of Letters Patent.  Patented Mar. 12, 1912.

Application filed November 21, 1910. Serial No. 593,533.

*To all whom it may concern:*

Be it known that I, JAMES A. CAMERON, a citizen of the United States, and a resident of the borough of Brooklyn, in the county of Kings, city and State of New York, have invented certain new and useful Improvements in Moving-Pictures Machines, of which the following is a specification.

In the prior art of moving picture machines, two distinct types have been developed, viz: one in which an intermittent sprocket and star wheel is used to move the picture past the exposure opening, and another, in which a rotary beater, a reciprocating pusher, an oscillating member, or similar device is used to advance the film intermittently past the exposure opening. This second type will be referred to herein as the ordinary beater construction.

The construction employing a star wheel is objectionable because the wear of the parts, and the back lash in the gears, together with the back lash between the sprocket and the sprocket holes in the film, produce inequalities in the feeding of the film which prevent uniform register of the picture with the exposure opening.

The construction employing the ordinary beater type is not only subject to the disadvantages of the intermittent sprocket, but has other disadvantages, which render it equally undesirable. Chief among these disadvantages may be mentioned the fact that in machines of the ordinary beater type the film advancing member has a set stroke equal to the amount of film it is desired to advance. This makes it necessary, in the proper operation of the device, that the beater shall engage the film at the precise moment it becomes taut. This is a condition that it is practically impossible to obtain, and for the following reasons: The wearing action of the film and the ordinary wear from friction in the parts that comprise the beater member will tend to decrease the effectiveness of the stroke of the beater, with the result that less than a proper amount of film is advanced by means of the beater, and the remainder must be advanced by other means and during the time when the picture should be projected. The lack of a fixed number of perforations to the foot of film causes a further inaccuracy in the effective stroke of the beater. The stroke must be calculated as to some definite picture length. The number of perforations to each picture is constant. When the number of perforations per foot of film varies, the picture lengths slightly vary, and the beater has more or less film to advance. When the amount is greater than the calculated amount, the remainder must be advanced by means other than the beater and at a time when the picture should be projected. The result of advancing the film at a time other than during the normal interval of obscuration is either that the interval of obscuration must be prolonged so as to cover these irregularities or that the film will be moved or "crawl" during the time of projection. Either of these conditions is objectionable.

In the ordinary beater type of machine the length of the film, between the retarding and take-up devices intermediate which the beater is located, must necessarily be greater than the length of film between the intermittent sprocket and the retarding device, in the star wheel type of machine, hence there will be a correspondingly greater amount of variable inequality in the register of the beater type.

The present invention has for its object to overcome these various objections. To this end the invention consists in a film retarding device and film advancing means potentially capable of advancing a greater amount of film during each cycle of the machine than the amount of film actually to be advanced acting to produce a slack section in the film prior to each film advancing movement and then acting to remove the slack and irregularities in the film and then to advance the same past the exposure opening. Specifically this may be accomplished by having suitable retarding and take-up devices, the latter of which may be an intermittent or continuously acting sprocket, adapted to move a definite amount of film during each cycle of the machine, and a member which in connection with the said devices acts to advance the film intermittently by alternately producing a slack and a tension in the film, said member having a relatively constant film advancing stroke moving a definite amount of film when the latter is under tension and having a variably effective slack take up stroke to take up the slack and irregularities in the film prior to the film advancing stroke. It is also desirable to provide a framing device, which, when operated, will not permanently destroy the relatively constant film advancing stroke of the film advancing member, that is to say, the film advancing member must always produce substantially the same amount of slack irrespective of the position of the framing device. If the adjustment of the framing device should permanently and appreciably alter the normal relation of the film to the film advancing member, so that the latter would produce a slack of an appreciably different quantity, the film advancing member would have a radical new constant film advancing stroke and the new constant film advancing stroke would then be appreciably out of step with the timing of the shutter, thereby producing a "ghost" on the picture.

Other objects will appear as the specification proceeds.

In the accompanying drawings, the invention is embodied in a concrete and preferred form, but wide variations may be made from the construction shown without departing from the legitimate and intended scope of the invention expressed in the appended claims.

In the said drawings: Figure 1 is a vertical sectional view of a machine embodying the invention. Figs. 2, 3, 4, 5 and 6 are diagrammatic views showing the relation between the film advancing member, the operating cam therefor, and the shutter. Fig. 7 shows a modified form of double-ended oscillating film advancing member. Fig. 8 is a detail view showing the framing device in two positions. Fig. 9 is a modification of the film advancing member.

Similar characters of reference indicate corresponding parts in the different views.

The film 1 is led down over suitable guides, such as the sprocket 2, with which coacts the guard roll 3, and the two guide rolls 4 and 5. The film then passes down, in the present instance, between the face plate 6 and gate 7 in which is located the exposure opening or light aperture 8. These members form a suitable retarding device which may exert a continuous tension on the film, or, as in the present embodiment of the invention, may exert an intermittent pressure or tension on the film. In the form here disclosed, the gate 7 is hinged at 9 and is normally held closed under tension by means of the latch 10 controlled by the spring 12. The latch is intermittently released by means of the cam lever 13 pivotally mounted at its lower end on the stud 14, and pivotally connected to the latch 10 at 15. A cam 17, mounted on the main shaft 16, acts against the cam roll 18 on the lever 13 to cause the latter to release the latch. In the present instance the film advancing means consist of the film advancing member 19 and sprocket or take-up device 28.

The member 19 may take many forms, but in the present instance it comprises two rolls 20 mounted, at a point intermediate the two rolls, on the rock shaft 21, thereby forming a double-ended member around which the film is passed. This member is caused to oscillate by suitable means such as the crank 22 and cam 23. The cam 23 will preferably be formed in the flywheel 24.

A suitable shutter as 25 is provided, pivoted at 26 and operated from the cam 16 by means of the crank lever 27.

The take-up device takes up or moves a definite amount of film during each cycle of the machine. This may take the form of an intermittent sprocket, or, as shown in the present instance, a constantly rotating sprocket 28 may be employed with which coöperates a guard roll 29 pivotally mounted at 30 and normally held in contact with said sprocket by means of the spring 31 acting against the cam 32. When the guard roll 29 is turned around its pivot 30, the spring 31 will hold it in its open position.

The framing device may consist of any suitable means, but in the present embodiment it consists of a member 33 mounted on the same center as the sprocket 28, being located between the film advancing member and the sprocket 28. This framing device is provided with a suitable surface consisting here of the plate 34 and roll 35. At its lower end the framing device is provided with a bifurcated portion 36 which may be clamped by means of the screw 37.

The operation is as follows: Assuming that the film has been threaded through the machine, the movement of the film advancing member 19 will, in the normal operation thereof, intermittently advance an equal amount of film once to each cycle of the machine. If, as sometimes happens, there should be a slippery part on the film, the film will slip past the retarding device with less friction than usual, and the film advancing member may thus draw down a greater amount of film than it should. Owing to the fact, however, that the take-up device 28 moves a definite amount of film once to each cycle of the machine, there will, under these conditions, be more slack in the film than there ought to be, and hence the film advancing member will, upon its next stroke, commence to act on the film later in point of time, and consequently a correspondingly less amount of film will be drawn down on its next stroke. This feature, it may be remarked, is not what we are concerned with in this case, since any machine of the beater type employing a take-up device that removes a definite amount of film will act in the same manner.

For the purpose of setting forth the operation of the machine, we will assume that the film advancing member operates normally so far as the feature just described is concerned. When so acting, the retarding device, comprising the face plate 6 and gate 7, will be the member that offers resistance to the action on the film by the film advancing member 19 and sprocket 28, serving to retard the advance of the film to the extent that transverse wrinkles and other inequalities in the film are removed and an amount of film corresponding to a picture length only is permitted to enter the field between the exposure opening and the take-up device. When the film advancing member occupies the position shown in Fig. 5, it will be in what we shall call its lowermost position, and acting against the retarding device 6—7, will hold the film taut. In its downward descent, the film advancing member will first make the film taut (see Figs. 2 and 3) and will then move it downwardly, still holding the film taut (see Figs. 4 and 5). When the film advancing member moves up, (Fig. 6) that is, during its idle movement, it will release the film faster than the take-up device 28 takes up the film, and hence at the beginning of its downward stroke there will be an accumulation of slack and wrinkles which returned when the tension was relieved during slack interval, as indicated in Fig. 2. Now in the old construction of the beater type, the film advancing member had a stroke equal to the amount of film to be advanced each time, and if the film was wrinkled transversely, or the slack had not been previously removed by the take-up device so that the film was brought to a taut line precisely at the beginning of the stroke, the said stroke of the film advancing member would not be sufficient to carry down the proper amount of film.

In the present machine, the stroke of the film advancing member has a movement potentially sufficient to move down a greater amount of film than is required, and therefore if the beater lags, the proper amount of film will still be advanced by the beater but a less amount of slack will be produced. Likewise, if there is a variation from the standard number of perforations per foot, the beater will automatically adopt a slightly new constant effective stroke for the time being. The film advancing member will therefore coöperate with the take-up in removing the slack in the film during its "slack take up stroke," that is to say: during the first part of its downward movement and prior to the commencement of the "film advancing stroke." In this manner the "film advancing stroke" will be normally constant both as to time and amount of film, (until a new constant effective stroke is adopted) while the "slack take up stroke" will be variably effective depending upon the irregularities in the film. In other words, the "slack take up stroke" will begin to act sooner or later on the film, but it will always complete its work at a definite time, viz: when the "film advancing stroke" begins.

The face plate 6 and gate 7 have been referred to as constituting a retarding device, but it will be understood that the tension thus exerted on the film must not be great enough to prevent the film advancing member from moving the film. The members 6 and 7 therefore constitute a yielding tension device. If the retarding device 6 and 7 is an intermittent one, as in the present case, the timing should be, and is, such that the tension is relieved substantially at the commencement of the film advancing movement of the member 19, and returned prior to completion of film advance.

When, as in the present instance, the take-up device 28 is active during the film advancing period, a certain amount of "crawl" of the film is produced. The "crawl" is the movement produced by the action of the take-up 28 causing the film to slide through or over the film advancing member, and a consequent movement of the film past the exposure opening. It is evident that inasmuch as the "film advancing stroke" of the film advancing member is relatively constant, the amount of "crawl" will also be constant, and hence can be figured as a definite part of the film advancing movement. The action of the take-up device 28 will further assist during the "slack take-up stroke" of the film advancing member in taking up the slack and in removing irregularities in the film.

The relative movement of the film advancing member and its effect upon the film is graphically illustrated in Figs. 2 to 6 inclusive.

One of the objections both to the intermittent sprocket and ordinary beater types of construction is the suddenness and violence with which the film advancing member engages the film. This objection is overcome in the present construction by so shaping the cam 23 that the beginning of the downward stroke of the film advancing member is relatively slow. The motion then increases and then slows down again at the end of the stroke. This action is likewise illustrated in Figs. 2 to 6 inclusive. The distance between the lines 40 and 41 indicates the slow starting movement during which the cam groove is almost concentric. The distance between the lines 41 and 42 indicates the relatively quick intermediate movement during which the rise in the cam is appreciable, and the distance between the lines 42 and 43 shows the slow finishing movement during which the cam becomes almost concentric again. At the end of the downward movement of the film advancing member it is necessary to stop the "crawl" produced by the take-up device, so that the two movements will terminate at the same time. To this end there is preferably provided a relief 44 in the cam 23, substantially at the point 43, so as to free the film from tension at the end of the film advancing stroke.

While any suitable film advancing member may be employed, it is preferred to have a double-ended member like the one 19 of Fig. 1, consisting of the two rolls, or like the member 45 shown in Fig. 7, which consists of two relatively spaced curved plates 46 pivoted at a point intermediate their ends. The reason for this is that with a comparatively short radial length more film can be moved in a given angular advance than if a single-ended member were employed.

As showing an example of other film advancing members which may be employed, there is illustrated in Fig. 9, a single-ended member 47 which would be operated by a cam similar to 23, this film advancing member also having a movement potentially sufficient to advance a greater amount of film than is actually required.

It is a well known fact that the period during which the picture is screened from view should be as short as possible. The eye is shocked by the alternations of light and darkness, and the longer the period of darkness the greater is the shock. The sensation or effect produced by the alternations of darkness and light is known as "flicker". To reduce the period of obscuration it is customary to commence moving the film slightly before the shutter entirely closes the exposure opening. If, however, the picture begins to move unduly in advance of or after the obscuration by the shutter, an effect known as a "ghost" is produced. A "ghost" is a condition where the objects in the picture do not stand out clearly, but run together in streaks.

It is difficult to secure a perfect register of the picture with the exposure opening, when first threading the film through the machine. For this and other reasons moving picture machines are usually provided with what is known as a framing device.

It is evident that the framing of the picture must not interfere with the timing of the film advancing member. In the present case, if the framing of the picture did interfere, the relatively constant "film advancing stroke" of the film advancing member would be appreciably changed and an appreciably new constant "film advancing stroke" would be created which would then be out of step with the shutter, and the film might begin to move too early in reference to the obscuration of the picture. The effect of this would be a "ghost" on the picture. This condition is avoided as follows: The timing of the shutter and the film advancing member is approximately constant with relation to each other. The film advancing member begins its active or "film advancing stroke" as soon as it has taken up the slack and irregularities in the film (note particularly Fig. 2). It will be apparent therefore that if the amount of this slack is permanently and appreciably altered, the "film advancing stroke" of the film advancing member will be correspondingly appreciably altered. So then to maintain the film advancing member in proper time with the shutter, the amount of slack produced by the film advancing member must be substantially constant. I have provided for this by maintaining the angle of the film issuing from the film advancing means a constant one at a given moment in the cycle of the machine. The manner in which the slack is produced will be best understood from a consideration of Fig. 8. From this it will be seen that as the rearward portion of the film advancing member moves upward, an amount of slack will be created in the stretch of film between the film advancing member and framing device. It will be evident that by altering the angle of the line of film extending between the framing device and film advancing member, the film advancing member could be made to kick up more or less slack. But by keeping the angle of this stretch of film substantially constant at a given moment in the cycle of the machine, substantially the same amount of slack will be produced upon each stroke of the film advancing member, regardless of the relative position of the framing device. This result is approximated in a simple and practical way by pivoting the framing device concentric with the sprocket roll or take-up device (see Fig. 1) and by drawing the contact surface of the framing device which engages the film, substantially on an arc whose center is that of the pivotal center of the framing device. The manner in which the angle of the film is kept substantially constant will be clear from Fig. 8 in which the dotted lines indicate a different position of the framing device.

What is claimed, is:

1. In a moving picture machine having an exposure opening, a film retarding device, and film advancing means potentially capable of advancing a greater amount of film past the exposure opening during each cycle of the machine than the amount of film actually to be advanced, acting to produce a slack in the film after each film advancing movement, and then acting in opposition to said film retarding device to remove said slack and irregularities in the film prior to the next film advancing movement.

2. In a moving picture machine having an exposure opening, the combination with a film, of a film retarding device and film advancing means, the latter potentially capable of advancing a greater amount of film past the exposure opening during each cycle of the machine than the amount of film actually to be advanced, said device and means acting upon said film to intermittently advance the same past the exposure opening, and to produce a slack section therein after the film is advanced and to remove said slack and irregularities in said film prior to the next advance of the film past the exposure opening.

3. In a moving picture machine having an exposure opening, the combination of a film retarding device, film advancing means potentially capable of advancing a greater amount of film past the exposure opening during each cycle of the machine than the amount of film actually to be advanced, and a film having a slack section between the retarding device and film advancing means during a portion of each cycle of the machine, said device and means acting upon said section to remove the slack and irregularities therein during one portion of the cycle of the machine and thereafter to advance the same during another portion of the same cycle of the machine.

4. In a moving picture machine provided with an exposure opening, the combination with film retarding and take-up devices, of a film advancing member, having a stroke potentially capable of advancing a greater amount of film past the exposure opening during each cycle of the machine than the amount of film actually to be advanced, and located intermediate the retarding and take-up devices, acting to take up the slack of and to remove irregularities in the film during the first part of its stroke and to advance the film past the exposure opening during the second part of its stroke.

5. In a moving picture machine provided with an exposure opening, the combination with film retarding and take-up devices, of a film beater, having a stroke potentially capable of advancing a greater amount of film past the exposure opening during each cycle of the machine than the amount of film actually to be advanced, and located intermediate the retarding and take-up devices acting to take up the slack of and to remove irregularities in the film during the first part of its stroke and to advance the film past the exposure opening during the second part of its stroke.

6. In a moving picture machine provided with an exposure opening, the combination with film retarding and take-up devices, the latter adapted to take up a definite amount of film during each cycle of the machine, of a film advancing member having a stroke potentially capable of advancing a greater amount of film past the exposure opening during each cycle of the machine than the amount of film taken up by the take-up device during the same cycle and located intermediate the retarding and take-up devices, for engaging the film and acting to take up the slack of and to remove irregularities in the film during the first part of its stroke and to advance the film past the exposure opening during the second part of its stroke.

7. In a moving picture machine provided with an exposure opening, the combination with film retarding and take-up devices, the latter adapted to take up a definite amount of film during each cycle of the machine, of a film beater having a stroke potentially capable of advancing a greater amount of film past the exposure opening during each cycle of the machine than the amount of film taken up by the take-up device during the same cycle and located intermediate the retarding and take-up devices, for engaging the film and acting to take up the slack of and to remove irregularities in the film during the first part of its stroke and to advance the film past the exposure opening during the second part of its stroke.

8. In a moving picture machine having an exposure opening, the combination with film retarding and take-up devices, of a film advancing member potentially capable of advancing a greater amount of film past the exposure opening during each cycle of the machine than the amount of film actually to be advanced, and a film having a slack section between the retarding and the take-up devices during a portion of each cycle of the machine, said devices and means acting upon said section to remove the slack and irregularities therein during one portion of the cycle of the machine and thereafter to advance the same during another portion of the same cycle of the machine.

9. In a moving picture machine having an exposure opening, the combination with film retarding and take-up devices, of a film beater potentially capable of advancing a greater amount of film past the exposure opening during each cycle of the machine than the amount of film actually to be advanced, and a film having a slack section between the retarding and the take-up devices during a portion of each cycle of the machine, said devices and film beater acting upon said section to remove the slack and irregularities therein during one portion of the cycle of the machine and thereafter to advance the same during another portion of the same cycle of the machine.

10. In a moving picture machine provided with an exposure opening, the combination with film retarding and take-up devices, the latter adapted to take up a definite amount of film during each cycle of the machine, of a film advancing member having a stroke potentially capable of advancing a greater amount of film past the exposure opening during each cycle of the machine than the amount of film taken up by the take-up device during the same cycle and located intermediate the retarding and take-up devices, and a film having a slack section between the retarding and take-up devices during a portion of each cycle of the machine, said devices and means acting upon said section to remove the slack and irregularities therein during one portion of the stroke of the film advancing member and thereafter to advance the same during another portion of the stroke of the film advancing member.

11. In a moving picture machine provided with an exposure opening, the combination with film retarding and take-up devices, the latter adapted to take up a definite amount of film during each cycle of the machine, of a film beater having a stroke potentially capable of advancing a greater amount of film past the exposure opening during each cycle of the machine than the amount of film taken up by the take-up devices during the same cycle and located intermediate the retarding and take-up devices, and a film having a slack section between the retarding and take-up devices during a portion of each cycle of the machine, said devices and film beater acting upon said section to remove the slack and irregularities therein during one portion of the stroke of the film beater and thereafter to advance the same during another portion of the stroke of the film beater.

12. In a moving picture machine provided with an exposure opening, the combination with a device adapted to take up a definite amount of film during each cycle of the machine, a film retarding device adapted to hold the film with sufficient tension to prevent movement thereof while any slack and irregularities therein are removed by stretching it, and a film advancing member located between the retarding and take-up devices and potentially capable of advancing a greater amount of film than that taken up by the take-up device during each cycle of the machine, whereby the film advancing member will, during the first part of its movement, intimately engage said film to take up the slack and place the film under tension thereby removing irregularities therein and when the film is thus under tension, will act to advance the same during the second part of its movement.

13. In a moving picture machine provided with an exposure opening, the combination with a device adapted to take up a definite amount of film during each cycle of the machine, a film retarding device adapted to hold the film with sufficient tension to prevent movement thereof while any slack and irregularities are removed by stretching it, and a film beater located between the retarding and take-up devices and potentially capable of advancing a greater amount of film than that taken up by the take-up device during each cycle of the machine, whereby the film beater will, during the first part of its movement, intimately engage said film to take up the slack and place the film under tension thereby removing irregularities therein, and when the film is thus under tension will act to advance the same during the second part of its movement.

14. In a moving picture machine, the combination with suitable film retarding and take-up devices, the latter adapted to move a definite amount of film during each cycle of the machine, of a film advancing member, having a stroke, potentially capable of advancing a greater amount of film during each cycle of the machine than the amount of film actually to be advanced, one part of which constitutes a slack take-up movement, and another part of which constitutes a film advancing movement.

15. In a moving picture machine, the combination with suitable film retarding and take-up devices, the latter adapted to move a definite amount of film during each cycle of the machine, of a film beater having a stroke, potentially capable of advancing a greater amount of film during each cycle of the machine than the amount of film actually to be advanced, one part of which constitutes a slack take-up movement and another part of which constitutes a film advancing movement.

16. In a moving picture machine having an exposure opening, the combination with suitable film retarding and take-up devices, the latter adapted to take up a definite amount of film during each cycle of the machine, of a film advancing member having an active and an idle stroke each corresponding to a greater amount of film than the amount of film taken up by the take-up device during each of said strokes, said film advancing member acting in conjunction with the devices during the first part of its active stroke to remove slack and irregularities in the film and during the second part of its stroke to advance the film, and acting during its idle stroke to release more film than the take-up device removes during said idle stroke.

17. In a moving picture machine having an exposure opening, the combination with suitable film retarding and take-up devices, the latter adapted to take up a definite amount of film during each cycle of the machine, of a film beater having an active and an idle stroke each corresponding to a greater amount of film than the amount of film taken up by the take-up device during each of said strokes, said film beater acting in conjunction with the devices during the first part of its active stroke to remove slack and irregularities in the film and during the second part of its active stroke to advance the film, and acting during its idle stroke to release more film than the take-up device removes during said idle stroke.

18. In a moving picture machine having an exposure opening, a shutter adapted to cover the said exposure opening during the advancing movement of the film, a take-up device, and a film advancing member for intermittently advancing the film past the exposure opening, said film advancing member having a film advancing stroke whose beginning is substantially constant with relation to the timing of the shutter, and picture framing means for varying the amount of film between the film advancing member and take-up device without substantially varying the relation between the beginning of the film advancing stroke of the film advancing member and the timing of the shutter.

19. In a moving picture machine, a film advancing member, a take-up device, and a framing device interposed between the film advancing member and the take-up device over which the film passes after leaving the film advancing member, said framing device adapted to vary the amount of film between the film advancing member and take-up device substantially without altering the angle of the film issuing from the film advancing member at a given moment in the cycle of the machine.

20. In a moving picture machine having an exposure opening, film retarding and take-up devices, a film advancing member located intermediate said devices for intermittently advancing the film past the exposure opening having a stroke potentially capable of advancing a greater amount of film during each cycle of the machine than the amount actually to be advanced, one portion of said stroke constituting a slack take-up stroke and another portion constituting a film advancing stroke, a shutter, adapted to cover the said exposure opening during the advancing movement of the film, whose movement is timed to be substantially constant with relation to the beginning of the film advancing stroke of the film advancing member, and picture framing means for varying the amount of film between the film advancing member and the take-up device without varying the timing of the film advancing stroke with relation to the timing of the shutter.

21. In a moving picture machine having an exposure opening, a film retarding device, film advancing means potentially capable of advancing a greater amount of film past the exposure opening during each cycle of the machine than the amount of film actually to be advanced, acting to produce a substantially constant amount of slack in the film after each film advancing movement, and then acting in opposition to said film retarding device to remove said slack and irregularities in the film prior to the next film advancing movement, and a framing device for framing the film at the exposure opening without permanently varying the constant amount of slack produced in the film by the film advancing means.

22. In a moving picture machine provided with an exposure opening, the combination with a device adapted to take up a definite amount of film during each cycle of the machine, an intermittently acting film retarding device adapted to hold the film with sufficient tension to prevent movement thereof while any slack and irregularities therein are removed by stretching it, and a film advancing member located between the retarding and take-up devices and potentially capable of advancing a greater amount of film than that taken up by the take-up device during each cycle of the machine, whereby the film advancing member will, during the first part of its movement, intimately engage said film to take up the slack and place the film under tension thereby removing irregularities therein and when the film is thus under tension, will act to advance the same during the second part of its movement.

23. In a moving picture machine provided with an exposure opening, the combination with a device adapted to take up a definite amount of film during each cycle of the machine, an intermittently acting film retarding device adapted to hold the film with sufficient tension to prevent movement thereof while any slack and irregularities are removed by stretching it, and a film beater located between the retarding and take-up devices and potentially capable of advancing a greater amount of film than that taken up by the take-up device during each cycle of the machine, whereby the film beater will, during the first part of its movement, intimately engage said film to take up the slack and place the film under tension thereby removing irregularities therein, and when the film is thus under tension will act to advance the same during the second part of its movement.

24. In a moving picture machine having an exposure opening, an intermittently acting film retarding device, and film advancing means potentially capable of advancing a greater amount of film past the exposure opening during each cycle of the machine than the amount of film actually to be advanced, acting to produce a slack in the film after each film advancing movement, and then acting in opposition to said film retarding device to remove said slack and irregularities in the film prior to the next film advancing movement.

25. In a moving picture machine having an exposure opening, the combination of an intermittently acting film retarding device, film advancing means potentially capable of advancing a greater amount of film past the exposure opening during each cycle of the machine than the amount of film actually to be advanced, and a film having a slack section between the retarding device and film advancing means during a portion of each cycle of the machine, said device and means acting upon said section to remove the slack and irregularities therein during one portion of the cycle of the machine and thereafter to advance the same during another portion of the same cycle of the machine.

26. In a moving picture machine having an exposure opening, a film retarding device, and film advancing means comprising two members, one a take-up device adapted to take up a picture length once to each cycle of the machine and the other a film beater having a stroke potentially capable of advancing a greater amount of film during each cycle of the machine than the amount of film actually to be advanced past the exposure opening, the two members acting on the film, in opposition to the retarding device, to make it taut by removing slack and irregularities therein, and then acting to advance the film a picture length past the exposure opening.

27. In a moving picture machine having an exposure opening, an intermittently acting film retarding device, and film advancing means comprising two members, one a take-up device adapted to take up a picture length once to each cycle of the machine, and the other a film beater having a stroke potentially capable of advancing a greater amount of film during each cycle of the machine than the amount of film actually to be advanced past the exposure opening, the two members acting on the film, in opposition to the retarding device, to make it taut by removing slack and irregularities therein, and then acting to advance the film a picture length past the exposure opening.

Signed at borough of Manhattan, New York city, in the county of New York and State of New York this 14th day of November A. D. 1910.

JAMES A. CAMERON.

Witnesses:
 LAURA E. SMITH,
 AXEL V. BEEKEN.